United States Patent [19]

Kuraoka et al.

[11] Patent Number: 4,553,427
[45] Date of Patent: Nov. 19, 1985

[54] ROTATIONAL REFERENCE POSITION DETECTION APPARATUS

[75] Inventors: Hiroaki Kuraoka; Toshinori Mizuno, both of Oubu; Katsumasa Matsui; Masahiro Ohba, both of Okazaki, all of Japan

[73] Assignee: Nippondenso Co., Ltd., Kariya, Japan

[21] Appl. No.: 587,011

[22] Filed: Mar. 7, 1984

[30] Foreign Application Priority Data

Mar. 8, 1983 [JP] Japan .................................. 58-37785
Mar. 14, 1983 [JP] Japan .................................. 58-42974

[51] Int. Cl.$^4$ ........................................... G01M 15/00
[52] U.S. Cl. ................................... 73/117.3; 123/414
[58] Field of Search ............... 73/116, 117.3; 324/167, 324/173, 174, 179; 123/414

[56] References Cited

U.S. PATENT DOCUMENTS 4,262,251  4/1981  Fujishiro et al. ............... 324/167 X
4,356,447 10/1982  Honig et al. ................... 73/117.3 X Primary Examiner—Jerry W. Myracle
Attorney, Agent, or Firm—Cushman, Darby & Cushman

[57] ABSTRACT

An engine crank angle determining arrangement including a rotor having teeth or slits wherein either a tooth is entirely omitted or the teeth or slits are formed with non-uniform intervals therebetween. The teeth or slits are detected by an electromagnetic pick-up device or a photocoupler, and the time intervals corresponding to the intervals between the teeth or slits in the signal thus detected are processed in accordance with a predetermined program. The time intervals thus processed are corrected in consideration of an engine low state or non-low state operating condition, such as for example transient condition or starting condition, of the engine. Processing is carried out in either of two different ways of calculating reference angles. One is based on a ratio of time differences between adjacent sensible elements when the engine is operated in a "low state", and the other is based on a time difference between the detected times of adjacent sensible elements when the engine is operated in a "non-low state". Accordingly an accurate angular position can be detected regardless of a single set of the pulse generating device and pulse detecting device.

8 Claims, 10 Drawing Figures

ROTATIONAL REFERENCE POSITION DETECTION APPARATUS

BACKGROUND OF THE INVENTION

1. Field of the Invention:

This invention relates in general to a rotational position detecting apparatus for detecting angular and reference positions of the rotating shaft of an internal combustion engine. More particularly the invention provides to an apparatus of a simplified construction, compared with known apparatus, utilizing only a single rotation signal generating device and a single rotation signal detecting device.

2. Description of the Prior Art:

Heretofore various apparatus have been proposed for detecting angular and reference positions of an internal combustion engine. In one such apparatus, a plurality of teeth are indented around a circuilar disc rotating in synchronism with the rotating part of the engine or around the rotor of the engine. Teeth movement is detected by a sensor such as a photocoupler or an electromagnetic pick-up device. A second sensor is provided for detecting a reference position (for instance as in the model 5MGE-U engine made by Toyoya). Although the apparatus functions effectively, it is disadvantageous in that it is expensive to produce. In another known apparatus, disclosed in U.S. Pat. No. 4,181,884, the reference position is detected by a single sensor which detects a lost portion among the teeth. In still another known apparatus as disclosed, in U.S. Pat. Nos. 3,930,201 and 4,265,210, the rotation detecting device has been made of a digital circuit.

SUMMARY OF THE INVENTION

According to the present invention, there is provided a reference position detecting apparatus for an internal combustion engine, wherein one or more of the teeth provided around the rotor or a circuit disc constituting one part of a rotation angle sensor are eliminated or deformed so as to exhibit unequality in the teeth angle. The teeth are sensed by an electromagnetic pick-up device or a photocoupler, and time intervals in an output signal corresponding to the distances between the teeth are subjected to mathematical operations under control of a program so that corrections are effected in accordance with the operating conditions during the transient time and starting time of the engine. In this manner an accurate detection of the reference position is achieved regardless of the simple construction of the apparatus comprising a single set of rotating signal generator and rotating angle detector.

DETAILED DESCRIPTION OF PREFERRED EMBODIMENTS

The invention will now be described in detail with reference to the accompanying drawings.

Figure 1:
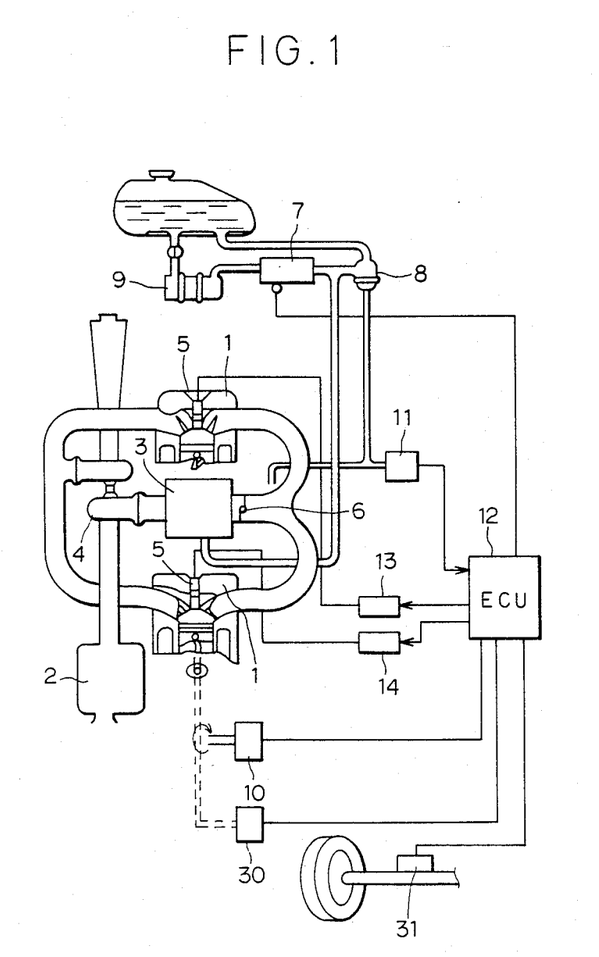
FIG. 1 is a schematic representation of a system constituting a first embodiment of the present invention.

Referring now to FIG. 1 there is shown a system of an internal combustion engine in which the present invention is utilized. Reference numeral 1 designates an internal combustion engine of V-type having two cylinders. Reference numeral 2 designates an air cleaner, numeral 3 a carburetor, numeral 4 a supercharger, 5 ignition plugs, 6 a throttle valve, 7 a fuel pump, 8 a pressure control valve, 9 a fuel filter, 10 a rotational angle sensor, 11 a suction pressure sensor, 12 a control circuit, 30 a starter sensor, 31 a vehicle speed sensor, and numerals 13 and 14 designate ignition coils. The two cylinders of the engine 1 receive air from the air cleaner 2 through the supercharger 4, carbureter 3 and the throttle valve 6. The suction pressure sensor 11 detects the loading condition of the engine as well as the supercharging pressure, while the rotational angle sensor 10 detects the angular position of the crank shaft. The control circuit 12 calculates optimum ignition time for the ignition spark plugs and energizing time periods of the ignition coils based on the output signals of the sensors and also a map or the like contained in the circuit for igniting the plugs.

The signal indicative of the angular position used in the calculations performed by the control circuit 12 is obtained as follows.

Figure 2A:
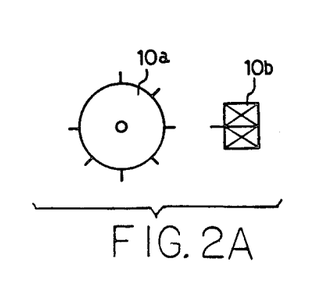
FIGS. 2A and 2B are schematic diagrams showing rotational angle sensors that may be used in the system.
Figure 2B:
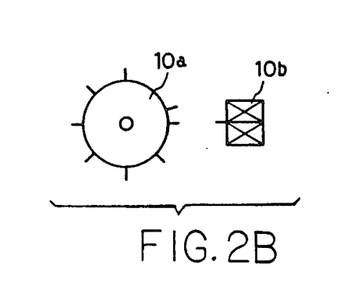
Figure 3:
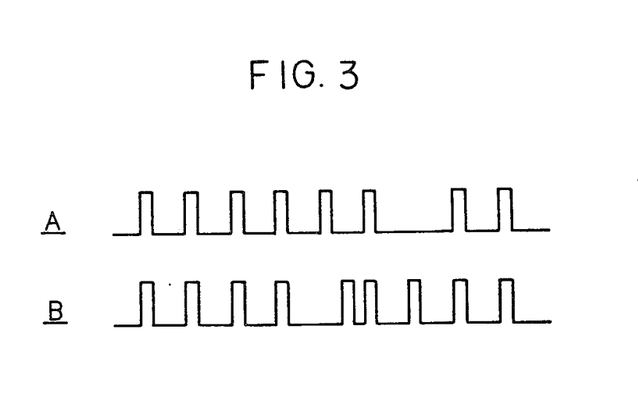
FIGS. 3A and 3B are waveform diagrams indicative of timing obtained after shaping the output of the sensors shown in FIGS. 2A and 2B, respectively.

FIGS. 2A and 2B illustrate a rotational angle sensors used in the present invention. The sensor comprises a rotor 10a and a pick-up coil 10b. FIG. 2A shows a construction of the rotor wherein one of the teeth is missing, while FIG. 2B shows another construction wherein the interval between the teeth is made unequal at one position of the teeth arrangement. The signals shown in FIGS. 3A and 3B are obtained by shaping the output signals from pick-up coils 10b shown in FIGS. 2A and 2B respectively, in an well known shaping circuit contained in the control circuit 12.

An embodiment of the present invention will now be described for use where the rotor shown in FIG. 2A.

Figure 4:
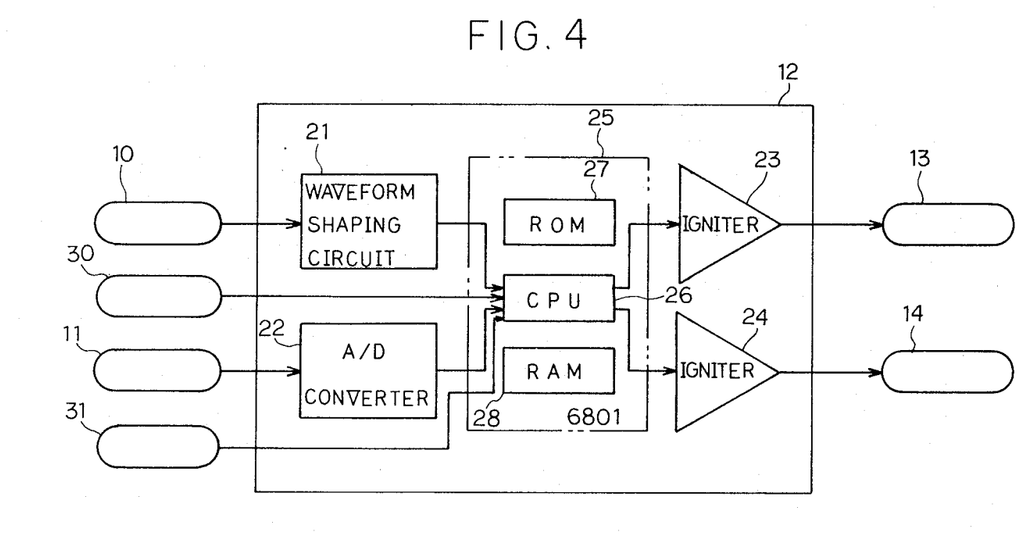
FIG. 4 is a block diagram of a control circuit used in the system shown in FIG. 1.

In FIG. 4, showing a block diagram of the control circuit 12 (shown as a block in FIG. 1) connected in hardware with the sensors 10, 12, 30 and 31 and ignition coils 13 and 14, the output signal obtained from the pick-up coil 10b of the sensor 10 is shaped in a waveform shaping circuit 21, while the output signal obtained from the suction pressure sensor 11 is converted into a binary signal by an A/D converter 22. The output signals from the shaping circuit 21 and the A/D converter 22 are applied to a microcomputer 25 comprising, in essence, a CPU 26, ROM 27 and a RAM 28. In this system, a MOTOROLA 6801 is used for the microcomputer 25. In the microcomputer, the cylinder to be ignited and the rotating speed of the engine are determined based on the output of the rotational angle sensor 10. By use of the rotating speed and the suction pressure as parameters, optimum ignition time and energizing period are then calculated for each cylinder based on a map stored in the microcomputer. Igniters 23 and 24 provided in the control circuit 12 energize and interrupt the ignition coils 13 and 14 upon reception of energizing and igniting signals delivered from the microcomputer.

A method for determining angular positions by use of the microcomputer will now be described.

Figure 5:
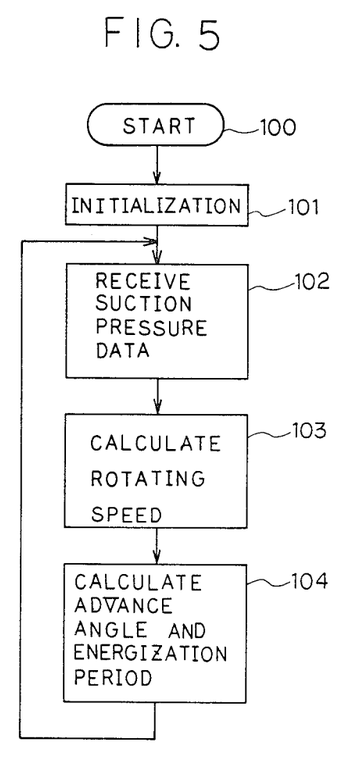
FIG. 5 is a flow diagram showing a general composition of a main routine.
Figure 6:
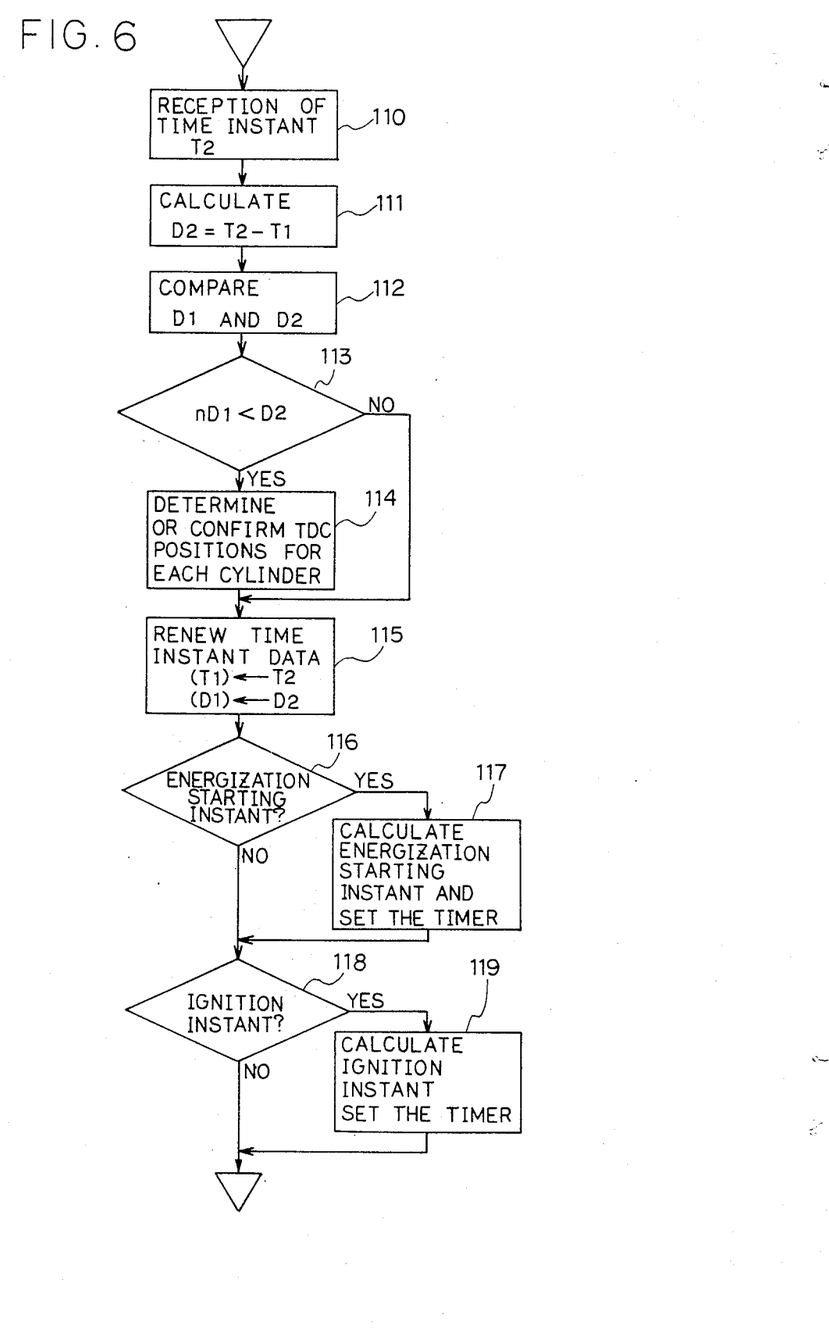
FIG. 6 is a flow diagram showing a general composition of an interrupting routine used with the first embodiment of the invention.
Figure 7:
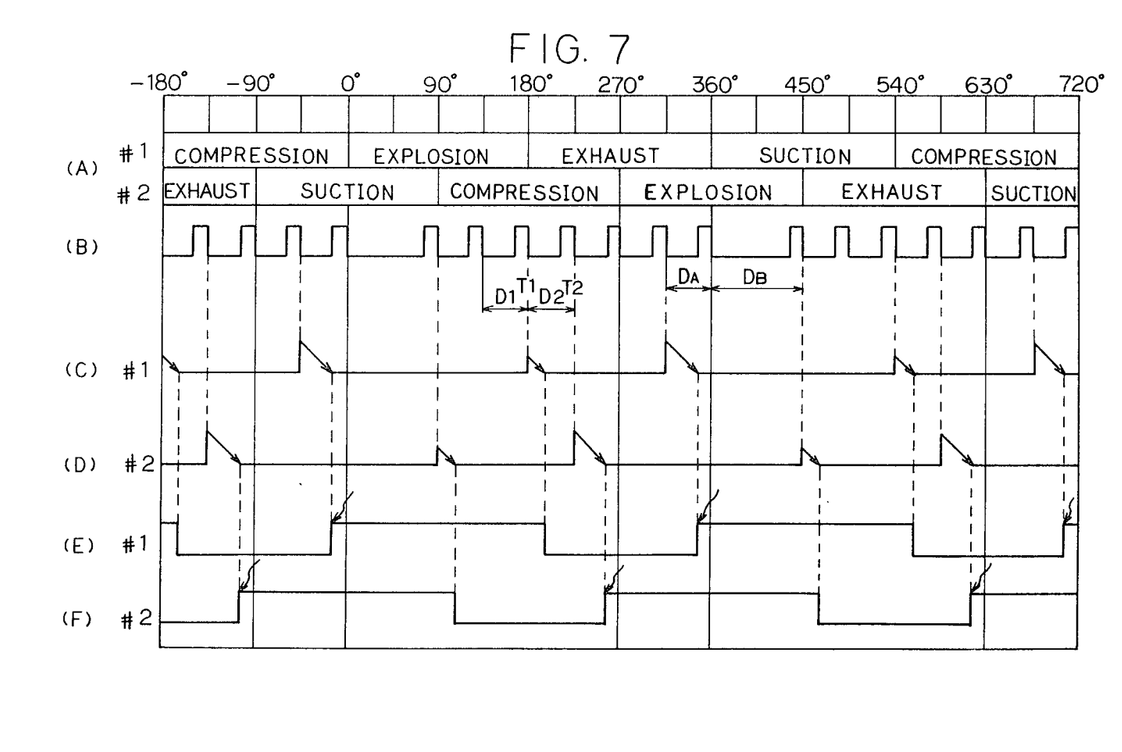
FIG. 7 is a diagram showing operational timing of the system shown in FIG. 1.

FIGS. 5 and 6 illustrate flow charts constituting a main routine and an interrupting routine, the latter constituting the first embodiment of the present invention. FIG. 7 illustrates a diagram showing the relation between the strokes of the cylinders, rotational signals, operations of timers, and the energization ignition signals. In FIG. 5 showing the main routine, a main program is initiated simultaneously with the start of the system operation in step 100. In a step 101 the system is set to the initial condition. Steps 102–104 are carried out once for every two turns of the crank shaft. In the step 102 the suction pressure is introduced. In the step 103 the time required for the two turns of the crank shaft is calculated for determining the rotating speed at the instant. In the step 104, an advance angle for ignition is determined by linear interpolation from a map corresponding to the rotating speed and the suction pressure, while an energization time period is determined by interpolation from a table corresponding to the rotating speed. The steps 102 through 104 are repeated for obtaining optimum enertization and ignition instants adapted to various conditions.

FIG. 6 illustrates an interrupting routine to be initiated by the rotational signal during the execution of the main routine shown in FIG. 5. In this example, it has been assumed that one within eight pulses, appearing at an equal interval of 45° crank angle as shown in line B of FIG. 7 of the rotational angle signal, is missing. The signal maintains a relation as shown in line A of FIG. 7 with the strokes of the engine cylinders. At each falling down of the pulses the execution of the main routine is interrupted, and the operation of the microcomputer is transferred to the interrupting routine. In a first step 110 of FIG. 6, a time instant $T_2$ for the present interruption is stored. In step 111 the time interval $D_2$ required for the present pulse is calculated from the difference between the time instant $T_2$ and a time instant $T_1$ that has been stored at the time of the interruption caused by the previous pulse. In steps 112 and 113, the time interval $D_2$ is compared with a time interval $D_1$ required for the previous pulse for investigating whether the $D_2$ is larger than $n \times D_1$ or not. The system has been so constructed that regardless of the starting time and the accelerating time where the speed variation of the engine is large, the time $D_B$ required for a pulse interval corresponding to the tooth missing part of the rotor is always larger than n-times the time interval $D_A$ required for the preceding pulse interval not including the missing tooth, and any one of the time intervals required for succeeding pulse pairs not including the missing tooth is always smaller than n-times the time interval required for the pulse pair immediately preceding the pulse pair. Accordingly if the time interval $D_2$ is found to be larger than $nD_1$, it is judged that the present pulse designates the reference position. In the next step 114, the "Top Dead Center" (TDC) of each cylinder is determined based on the reference position or when the TDC has been determined already, the correctness of the TDC position is confirmed. If the time interval $D_2$ is found to be smaller than $nD_1$, the pulse is judged to be not indicative of the reference position, and the program is shifted to the next step 115 wherein the time interval $D_2$ and the time instant $T_2$ are shifted to a register for replacing the previously measured time interval $D_1$ and time instant $T_1$. By the above described operations the reference position detecting algorithm is completed.

In the following step 116, it is judged whether the starting instant of the coil energization is between the present pulse and the following pulse or not. If the starting instant falls therebetween, the advance angle of the ignition and the energization time period beforehand obtained and corrected based on the current pulse interval for obtaining a coil energization starting instant and thereby setting the energization starting time. In step 118 it is also judged whether the ignition instant is between the present pulse and the following pulse or not. If the ignition instant falls therebetween, the advance angle of the ignition is corrected based on the current pulse interval for obtaining the ignition instant and setting the ignition timer. After setting the timers, the operation is transferred from the interrupting routine to the main routine. In FIG. lines C and D of 7, schematically illustrate the counting status of the energization starting timer and the ignition timer, while line E and F of FIG. 7 illustrate the energization and ignition signals delivered from the output terminals of the microcomputer to the ignitors upon down-counts of the timers. That is the initial value setting operation in each counter is realized by the interruption occurring with the falling-down of a rotational signal pulse appearing immediately prior to the count terminating instant of the counter, and the ignition is effectuated at an instant reducing the count of the counter to zero.

A second embodiment of the present invention will now be described.

Figure 8:
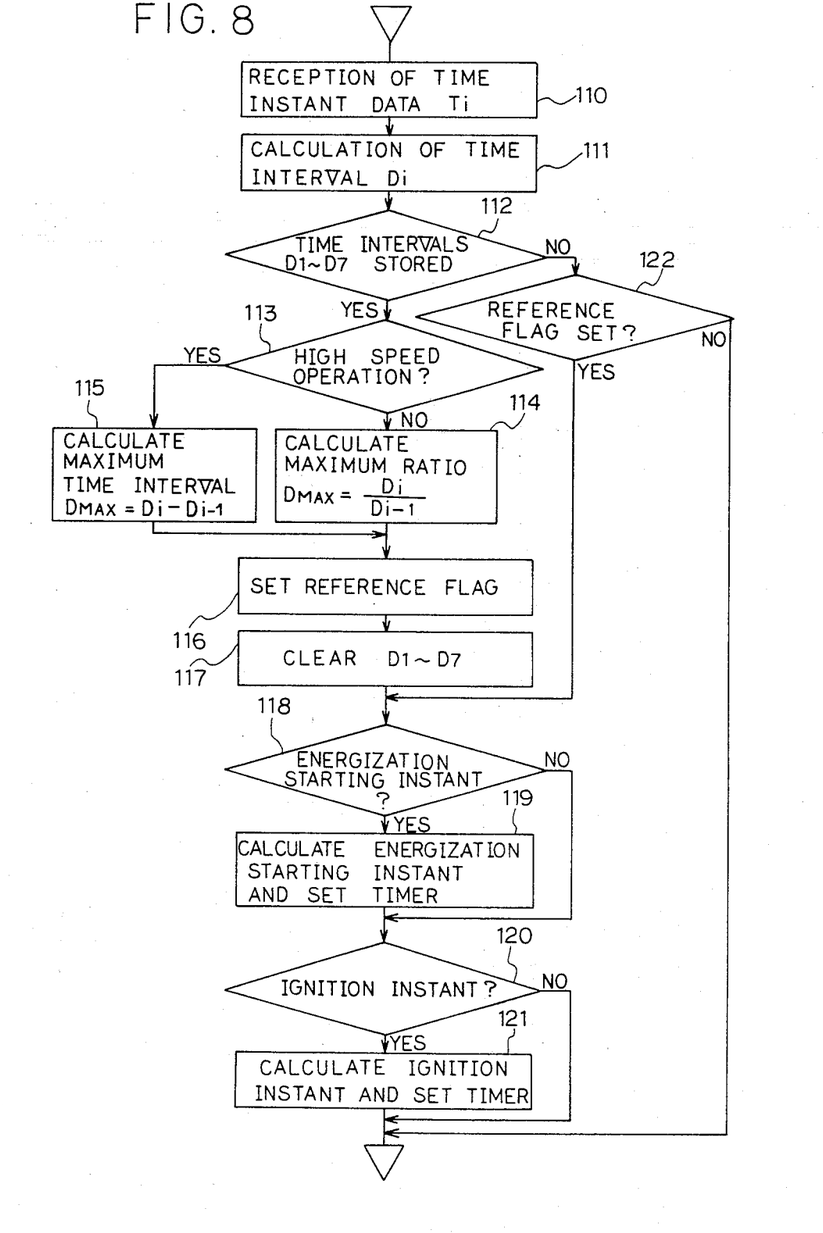
FIG. 8 is a flow diagram showing another interrupting routine used in a second embodiment of the invention.

FIG. 8 illustrates another interrupting routine operated in accordance with the rotational signal. During the execution of the main routine shown in FIG. 5, the operation of the microcomputer is interrupted and jumped to the interrupting routine.

Figure 9:
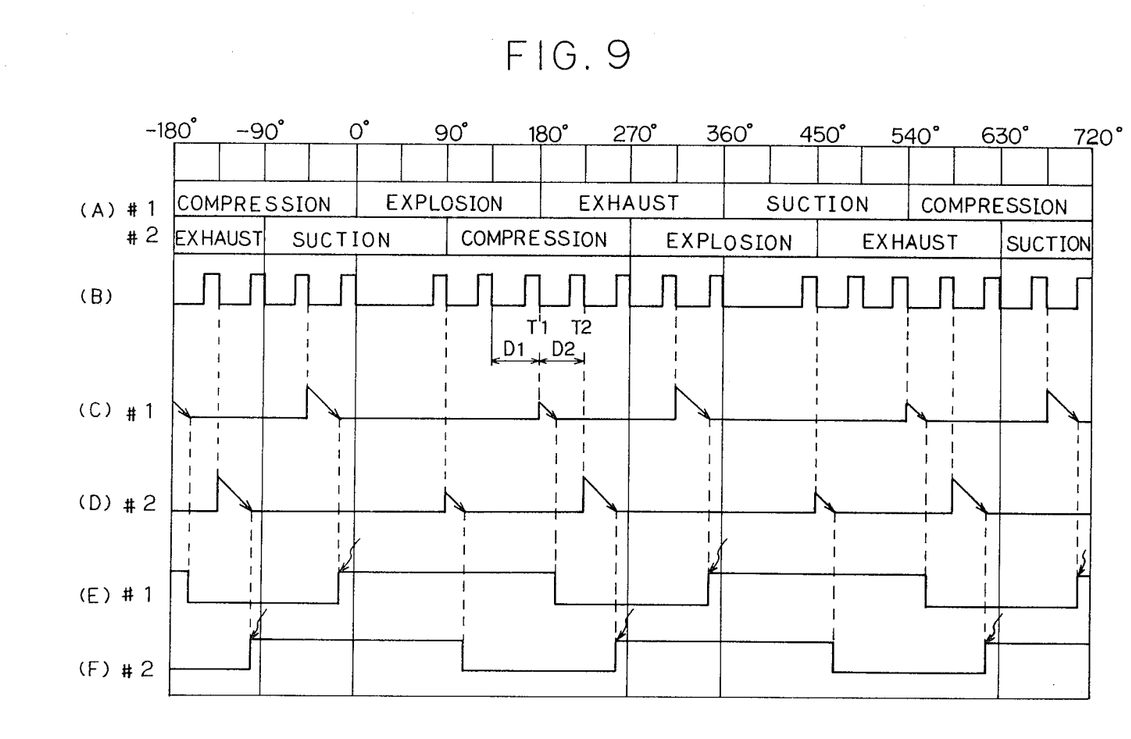
FIG. 9 is a diagram showing operational timing in the second embodiment of the invention.

In the second embodiment also the rotational signal as shown at line B of FIG. 9 wherein one out of eight pulses appearing at equal intervals of 45° crank angle is missing. The relation between the rotational signal and engine stroke is shown by line A of FIG. 9.

Lines C–F of FIG. 9 are substantially identical to the corresponding lines of FIG. 7 and therefore their description will not be repeated.

The interrupting routine is initiated each time the rotational signal pulses fall down. In a step 110 of FIG. 8, time instants $T_i$ at which the interruption occurs are stored. In a step 111, time intervals $D_{i-1}$ such as $D_1$ through $D_7$ are calculated from the difference between $T_i$ and the previously stored $T_{i-1}$ and successively stored in seven registers. In step 112, whether the seven time intervals $D_1$ through $D_7$ have been stored or not is judged, and when not stored, the operation is shifted to step 122. In the step 122, it is judged whether the rotation of the engine is the first one in the starting time or not. If not, a reference flag has been set and hence the operation is shifted to step 118.

In case where the time intervals $D_1$–$D_7$ have been stored, the operation is shifted from the step 112 to the step 113 for judging whether the engine is in a low-speed operation allowing sufficient process time, or in a high-speed operation causing an insufficient process time. If the engine is in the low-speed condition, the operation is shifted to step 114 wherein the time instant of the ratio $D_i/D_{i-1}$ becoming maximum is detected for obtaining the reference position. Since the rotation of the engine at the time of starting, accelerating and decelerating is varied substantially in a constant acceleration or deceleration manner, a method for simply comparing time intervals would cause an erroneous detection. It is apparent that a more accurate result can be obtained from a ratio of the time intervals. However the calculation of the ratio requires a long process time necessitating one division or more than two multiplications. In a high-speed condition, the rotating speed is not much varied even in the accelerating or decelerating time. For this reason, in step 115 the largest difference between time intervals is detected for economizing the process time required for determining the reference position. In the following step 116, a reference flag is set, and the computer 12 then operates based on the reference position. However, because of noises and the like, it is required to confirm the reference position for each rotation of the engine. In step 117, the time intervals $D_1$ through $D_7$ are cleared for repeating the reference position determining operations. In steps 118 through 121, whether the present angular position is appropriate for starting energization or not and also for starting ignition or not are judged. When the present angular position is judged to be appropriate, accurate energization starting instant and ignition instant are calculated and set in timers.

In the above described procedure, the discrimination of the high-speed operation and the low-speed operation of the engine has been carried out in step 113 from the rotating speed of the same. However, it is of course possible to carry out the discrimination from either one or more of a starter signal, throttle closing signal, vehicle speed signal, or other rotation signals. For instance, the low-speed operation may be discriminated from a starter-on signal or a throttle closing signal, while the high-speed operation of the engine may be discriminated from a starter-off signal and the like, so that the reference angular position is detected in a transferred manner from the results of the discrimination.

Although in the above description the calculations and comparisons have been carried out every input of pulses, the angular reference position may otherwise be detected in a manner such that only time instants $T_i$ are stored for a period corresponding to one complete cycle, and upon expiration of one complete cycle plus one pulse period, the calculations and comparisons are carried out continuously.

It is apparent that the ignition control may easily be replaced with a fuel injection control of the engine. For instance, the energization starting instant may be replaced by an injection starting instant, and the ignition instant may be replaced by an injection terminating instant.

Although a V-type two cylinder engine has been described in the embodiment of the invention, the present invention may otherwise be applied to engines having four to eight cylinders.

In the above description, the reference position has been detected baed on a ratio between angular data. However, depending upon the relation between the entire number of teeth of the sensor and the number of missing teeth, the reference position may be detected based on a difference between the angular data.

Furthermore, although a sensor having a number of teeth has been assumed in the above description, it would be apparent that a system utilizing a rotatable or photo-sensor having a number of indentations may exhibit advantageous features similar to those of the above described embodiments.

What we claim is:

1. An engine crank angle determining arrangement comprising:
    a rotatable member coupled to a crankshaft of said engine so as to rotate in synchronism therewith and having a plurality of spaced sensible elements, said sensible elements being arranged with uniform angular spacing except that one such element shall be missing;
    detecting means for detecting the rotation of said sensible elements and generating an angle signal indicative thereof, said angle signal including information as to the times said sensible elements are in a predetermined positional relationship with said detecting means;
    sensor means for sensing at least one engine condition and generating an engine condition signal indicative thereof; and
    an electronic control device, coupled to receive said engine condition signal and said angle signal, said electronic control device including an engine condition detecting means for determining, responsive to said engine condition signal, whether said engine is operating in a "low" state or not, and crank angle determining means, coupled to said engine condition detecting means, for processing said angle signal to determine a reference crank position either (a) based on a time difference between the times adjacent sensible elements are in said predetermined positional relationship with said detecting means if the engine is not operating in said low state or (b) based on a ratio of time differences between the times that adjacent pairs of sensible elements are in said predetermined positional relationship with said detecting means if said engine is operating in said low state.

2. An arrangement according to claim 1 wherein said sensor means includes means for determining engine speed in response to said angle signal and wherein said low state is defined by said engine condition detecting means to be an engine speed less than a predetermined amount.

3. An arrangement according to claim 1 wherein said sensor means includes means for determining whether a vehicle starter is being operated and wherein said low state is defined by said engine condition detecting means to be the operation of said vehicle starter.

4. An arrangement according to claim 1 wherein said sensor means includes means for determining vehicle speed and means for determining a vehicle throttle valve closing condition and wherein said low state is defined by said engine condition detecting means to be the vehicle operating at less than a predetermined speed and the throttle valve being in said closed condition.

5. An engine crank angle determining arrangement comprising:
    a rotatable member coupled to a crankshaft of said engine so as to rotate in synchronism therewith and having a plurality of spaced sensible elements, said sensible elements being arranged with non-uniform angular spacing;
    detecting means for detecting the rotation of said sensible elements and generating an angle signal indicative thereof, said angle signal including information as to the times said sensible elements are in a predetermined positional relationship with said detecting means;

sensor means for sensing at least one engine condition and generating an engine condition signal indicative thereof; and an electronic control device, coupled to receive said engine condition signal and said angle signal, said electronic control device including a engine condition detecting means for determining, responsive to said engine condition signal, whether said engine is operating in a "low" state or not, and crank angle determining means, coupled to said engine condition detecting means, for processing said angle signal to determine a reference crank position either (a) based on a time difference between the times adjacent sensible elements are in said predetermined positional relationship with said detecting means if the engine is not operating in said low state or (b) based on a ratio of time differences between the times that adjacent pairs of sensible elements are in said predetermined positional relationship with said detecting means if said engine is operating in said low state.

6. An arrangement according to claim 5 wherein said sensor means includes means for determining engine speed in response to said angle signal and wherein said low state is defined by said engine condition detecting means to be an engine speed less than a predetermined amount.

7. An arrangement according to claim 5 wherein said sensor means includes means for determining whether a vehicle starter is being operated and wherein said low state is defined by said engine condition detecting means to be the operation of said vehicle starter.

8. An arrangement according to claim 5 wherein said sensor means includes means for determining vehicle speed and means for determining a vehicle throttle valve closing condition and wherein said low state is defined by said engine condition detecting means to be the vehicle operating at less than a predetermined speed and the throttle valve being in said closed condition.

* * * * *